(12) United States Patent
Yamashita

(10) Patent No.: US 9,693,215 B2
(45) Date of Patent: Jun. 27, 2017

(54) ELECTRONIC APPARATUS AND WIRELESS DEVICE CHECKING METHOD

(71) Applicant: ALPINE ELECTRONICS, INC., Shinagawa-ku, Tokyo (JP)

(72) Inventor: Hirokazu Yamashita, Iwaki (JP)

(73) Assignee: ALPINE ELECTRONICS, INC., Tokyo (JP)

(*) Notice: Subject to any disclaimer, the term of this patent is extended or adjusted under 35 U.S.C. 154(b) by 285 days.

(21) Appl. No.: 14/516,175

(22) Filed: Oct. 16, 2014

(65) Prior Publication Data
US 2015/0189488 A1 Jul. 2, 2015

(30) Foreign Application Priority Data

Dec. 26, 2013 (JP) ................. 2013-270567

(51) Int. Cl.
H04W 8/00 (2009.01)
H04W 84/12 (2009.01)
H04W 88/06 (2009.01)
H04W 88/10 (2009.01)
H04L 29/08 (2006.01)
H04W 8/22 (2009.01)
(Continued)

(52) U.S. Cl.
CPC ............ H04W 8/005 (2013.01); H04L 67/12 (2013.01); H04W 8/22 (2013.01); H04W 76/023 (2013.01); H04W 84/12 (2013.01); H04W 88/06 (2013.01); H04W 88/10 (2013.01); H04M 1/6091 (2013.01); H04W 12/08 (2013.01)

(58) Field of Classification Search
CPC .. H04W 8/22; H04L 41/5012; H04L 43/0882; H04L 43/16
See application file for complete search history.

(56) References Cited

U.S. PATENT DOCUMENTS 7,254,480 B2* 8/2007 Watanabe ............ G01C 21/26
455/500
7,668,570 B2 2/2010 Watanabe et al.
(Continued)

FOREIGN PATENT DOCUMENTS

FR 2938719 5/2010
JP 2005-64855 A 3/2005
(Continued)

OTHER PUBLICATIONS

Extended European search report for EP14198573 dated Mar. 25, 2015, 13 pgs.
(Continued)

Primary Examiner — Robert Morlan
Assistant Examiner — Nourali Mansoury
(74) Attorney, Agent, or Firm — Brinks Gilson & Lione

(57) ABSTRACT

An in-vehicle apparatus is capable of connecting to wireless devices by using a plurality of wireless communication modes and includes a wireless device retrieval section configured to retrieve a connectable wireless device for each of the plurality of wireless communication modes, and a wireless communication mode display processing section, a display processing section, and a display device that are configured to display wireless communication modes corresponding to connectable wireless devices whose existence has been checked by the wireless device retrieval section.

20 Claims, 7 Drawing Sheets

(51) Int. Cl.
*H04W 76/02* (2009.01)
*H04M 1/60* (2006.01)
*H04W 12/08* (2009.01)

(56) References Cited

U.S. PATENT DOCUMENTS

| | | | |
|---|---|---|---|
| 7,730,158 B2* | 6/2010 | Watanabe | H04L 67/12 709/216 |
| 8,108,462 B2 | 1/2012 | Morotomi | |
| 2004/0106399 A1* | 6/2004 | Ki | G06Q 30/0283 455/422.1 |
| 2005/0174962 A1 | 8/2005 | Gurevich | |
| 2006/0104235 A1 | 5/2006 | Fritz et al. | |
| 2007/0081506 A1* | 4/2007 | Yamada | H04W 84/02 370/338 |
| 2008/0250096 A1* | 10/2008 | Koide | H04N 21/43637 709/201 |
| 2010/0138149 A1 | 6/2010 | Ohta et al. | |
| 2010/0178872 A1* | 7/2010 | Alrabady | H04W 4/02 455/41.3 |
| 2010/0241982 A1* | 9/2010 | Motosugi | G06F 3/1204 715/771 |
| 2012/0105637 A1* | 5/2012 | Yousefi | H04N 7/183 348/148 |
| 2012/0106396 A1 | 5/2012 | Sakai | |
| 2013/0196646 A1* | 8/2013 | Oh | H04W 4/001 455/418 |
| 2013/0260690 A1* | 10/2013 | Cha | H04B 7/26 455/41.2 |
| 2013/0315493 A1* | 11/2013 | Sato | G06T 9/007 382/232 |
| 2015/0019227 A1* | 1/2015 | Anandarajah | G10L 15/22 704/257 |

FOREIGN PATENT DOCUMENTS

| | | |
|---|---|---|
| JP | 2005-94053 A | 4/2005 |
| JP | 2006-318284 A | 11/2006 |
| JP | 2007-179330 | 7/2007 |
| JP | 2011-15285 | 1/2011 |
| WO | WO2006/052214 | 5/2006 |

OTHER PUBLICATIONS

Erik Weiss, et al. "Architecture of an Always Best Connected Vehicular Communication Gateway" 2006 IEEE 64$^{th}$ Vehicular Technology Conference VTC 2006-Fall; Sep. 25-28, 2006, Montreal, Quebec, Canada, Piscataway, NJ: IEEE Operations Center, Sep. 1, 2006 (Sep. 1, 2006), 5 pgs.

Office Action from Japanese Patent Office dated Apr. 18, 2017 for related Japanese Patent Application No. 2013-270567 (3 pgs).

* cited by examiner

FIG. 5
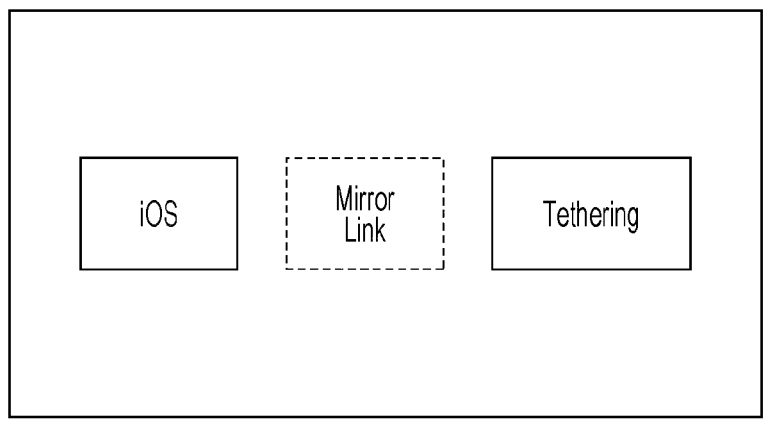
FIG. 6
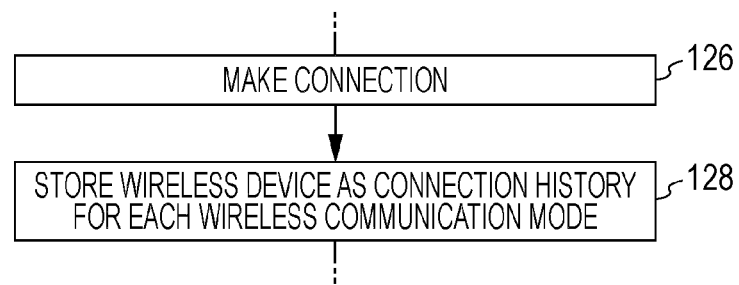
FIG. 7
| # | MAC ADDRESS | LAST MODE |
|---|---|---|
| A | 12:34:56:78:9a:bc | Mirror Link |
| B | 12:22:33:44:55:66 | iOS in the Car |
| C | 92:88:77:66:55:44 | Tethering |

ELECTRONIC APPARATUS AND WIRELESS DEVICE CHECKING METHOD

RELATED APPLICATION

The present application claims priority to Japanese Patent Application Number 2013-270567, filed Dec. 26, 2013, the entirety of which is hereby incorporated by reference.

BACKGROUND

1. Field of the Invention

The present invention relates to an electronic apparatus that has a plurality of wireless communication modes and is capable of connecting to a plurality of wireless devices, and a wireless device checking method.

2. Description of the Related Art

Hitherto, a communication apparatus that has different wireless communication modes and selectively connects to one of a plurality of wireless devices is known (see, for example, Japanese Unexamined Patent Application Publication No. 2011-15285). This communication apparatus has two types of wireless communication modes for infrastructure communication and ad hoc network communication, and when an opposite infrastructure device (access point) that is capable of performing infrastructure communication exists, the communication apparatus performs communication using a wireless communication mode for infrastructure communication on a priority basis.

In the communication apparatus disclosed in Japanese Unexamined Patent Application Publication No. 2011-15285, when wireless devices corresponding to respective wireless communication modes exist, a preferential connection to a high-priority wireless device may be made. However, before communication with any of the wireless devices is actually started, wireless communication modes corresponding to actually connectable wireless devices that exist are not able to be checked in advance. For example, in the above-mentioned communication apparatus, a user is not able to check in advance that there exist two types of wireless communication modes for infrastructure communication and ad hoc network communication which correspond to connectable wireless devices. Thus, after it is checked that these wireless communication modes are enabled, the user himself/herself is not able to select a wireless communication mode for ad hoc network communication and also select a wireless device corresponding to this wireless communication mode.

The present invention has been accomplished in view of such problems, and an object of embodiments thereof is to provide an electronic apparatus that enables a user to check a plurality of wireless communication modes corresponding to actually connectable wireless devices and to select any wireless communication mode from among them, and a wireless device checking method.

SUMMARY

In order to solve the above-mentioned problems, an aspect of one embodiment of the present invention provides an electronic apparatus capable of connecting to wireless devices by using one of a plurality of wireless communication modes. The electronic apparatus includes: a wireless device retrieval unit configured to retrieve a connectable wireless device for each of the plurality of wireless communication modes; and a wireless communication mode display unit configured to display wireless communication modes corresponding to connectable wireless devices whose existence has been checked by the wireless device retrieval unit.

Another aspect of one embodiment of the present invention provides a wireless device checking method for checking a wireless device connectable to an electronic apparatus by using one of a plurality of wireless communication modes. The method includes the steps of: retrieving, with a wireless device retrieval unit, a connectable wireless device for each of the plurality of wireless communication modes; and displaying, with a wireless communication mode display unit, wireless communication modes corresponding to connectable wireless devices whose existence has been checked by the wireless device retrieval unit.

Thus, when there are a plurality of wireless communication modes corresponding to actually connectable wireless devices whose existence has been checked, the plurality of wireless communication modes are displayed, and a user may therefore see the displayed details to check the plurality of wireless communication modes.

The electronic apparatus preferably further includes: an operation unit configured to receive an operation instruction given by a user; a wireless communication mode selection unit configured to select, in accordance with an operation instruction from the user received by the operation unit, one from among the wireless communication modes displayed by the wireless communication mode display unit; and a wireless connection unit configured to make a wireless connection to a wireless device corresponding to the wireless communication mode selected by the wireless communication mode selection unit. Thus, the user may select any one from among a plurality of wireless communication modes corresponding to actually connectable wireless devices whose existence has been checked.

The wireless communication mode display unit preferably displays a wireless communication mode corresponding to a connectable wireless device whose existence has not been checked in a display style in which the wireless communication mode can be distinguished from the wireless communication modes corresponding to the connectable wireless devices whose existence has been checked. This may save the user from having to make a selection again because the user has incorrectly selected a wireless communication mode corresponding to a connectable wireless device that does not exist.

The electronic apparatus preferably further includes: a wireless device storage unit configured to associate retrieval results provided by the wireless device retrieval unit with the respective plurality of wireless communication modes, and store the retrieval results; and a wireless device display unit configured to read, from the wireless device storage unit, connectable wireless devices corresponding to the wireless communication mode selected by the wireless communication mode selection unit, and display the connectable wireless devices. Thus, after a wireless communication mode is selected, a time period taken to check a wireless device connectable using this wireless communication mode may be reduced.

The electronic apparatus preferably further includes a wireless device selection unit configured to select, in accordance with an operation instruction from the user received by the operation unit, one from among the wireless devices displayed by the wireless device display unit. The wireless connection unit preferably makes a wireless connection to the wireless device selected by the wireless device selection unit. Because a connectable wireless device has been authenticated in advance, a time period that elapses before the wireless device to which a connection has been made after specifying a wireless communication mode starts to operate may be reduced.

The electronic apparatus preferably further includes: a connection history storage unit configured to store, as a connection history, identification information of a wireless device that has been last connected for each wireless communication mode; and a warning unit configured to read the connection history stored in the connection history storage unit when power is applied, and output a predetermined warning when the wireless device retrieval unit retrieves the wireless device contained in the connection history in combination with a wireless communication mode different from that contained in the connection history. Thus, the user may be notified of a change in a usage environment relating to, for example, forgetting to turn on a wireless device which is usually used, and a careless mistake may be dealt with in advance.

The electronic apparatus preferably further includes a connection history storage unit configured to store, as a connection history, identification information of a wireless device that has been connected immediately before power-off and a wireless communication mode corresponding to the wireless device. The wireless connection unit preferably reads the connection history stored in the connection history storage unit when power is applied, and when a wireless connection corresponding to the wireless communication mode and the wireless device that are specified in the connection history can be made, the wireless connection unit preferably makes a wireless connection to the wireless device. Thus, as a result of checking a wireless device that has been actually connected for each of a plurality of wireless communication modes, when a wireless device that has been last connected can be connected once again, a connection to this wireless device may be made, and operations may continue to be performed.

The wireless device retrieval unit preferably performs continuous transmission of a corresponding probe request or beacon for each of the plurality of wireless communication modes. This may reduce trouble and time in comparison to the case where a plurality of wireless communication modes are individually selected and the existence or non-existence of a wireless device is checked.

The wireless device retrieval unit preferably retrieves a wireless device at startup. Thus, the user may check or select a wireless communication mode corresponding to a usable wireless device without performing a specific operation at startup.

The wireless device retrieval unit preferably retrieves a wireless device at a point in time specified by the user. Thus, the user may check or select a wireless communication mode corresponding to a usable wireless device without performing a complicated operation in the case where, for example, a usage environment of a wireless device is changed.

BRIEF DESCRIPTION OF THE DRAWINGS

FIG. 5 illustrates an example of a wireless communication mode display;

FIG. 6 is a partial flowchart illustrating an additional operation step required to store a connection history according to a first modification;

FIG. 7 illustrates stored details of a wireless device that has been actually connected for each wireless communication mode;

DESCRIPTION OF THE PREFERRED EMBODIMENTS

Figure 1:
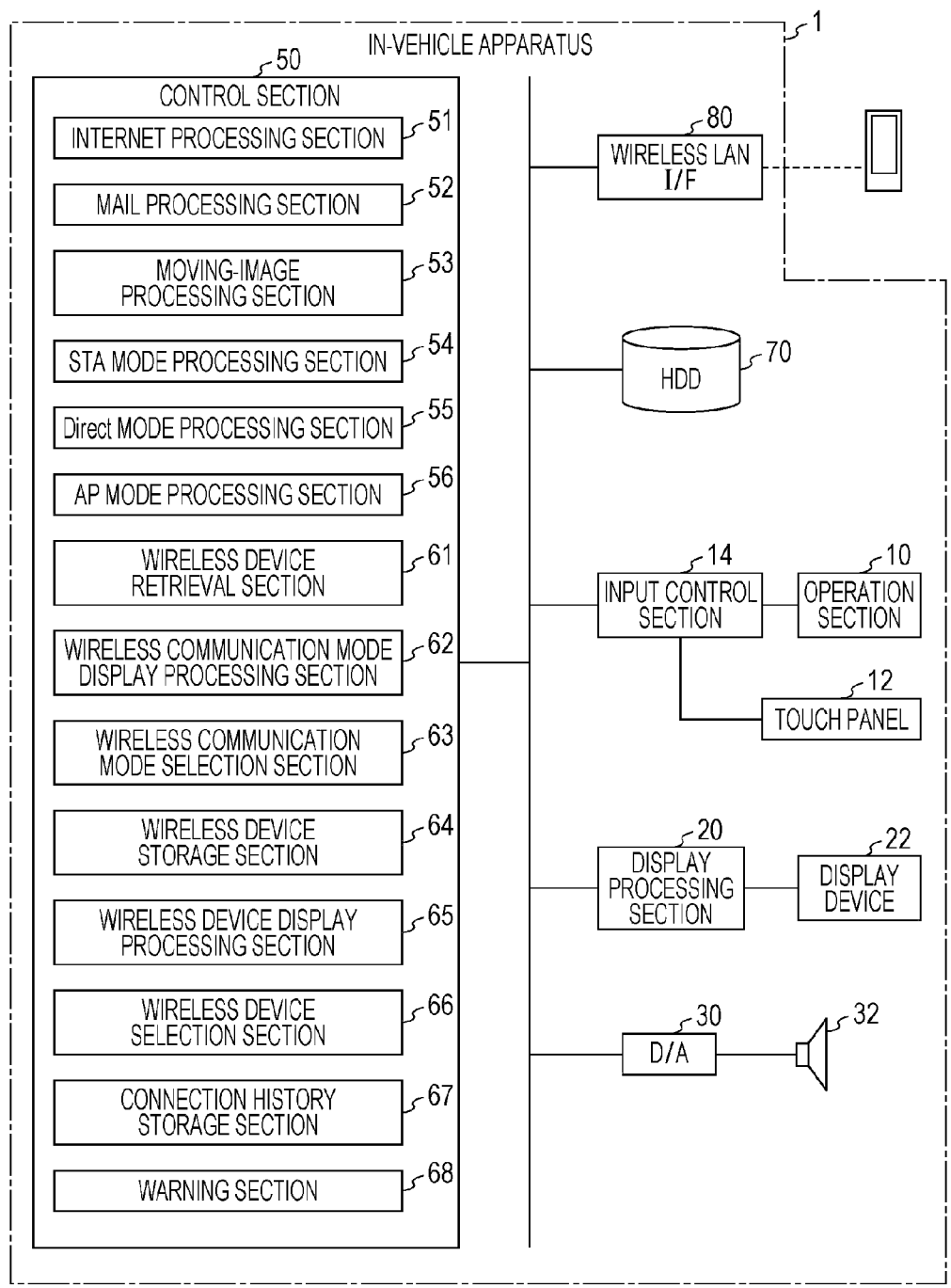
FIG. 1 illustrates the configuration of an in-vehicle apparatus according to an embodiment.

An in-vehicle apparatus according to an embodiment serving as an electronic apparatus to which the present invention is applied will be described below with reference to the drawings. FIG. 1 illustrates the configuration of the in-vehicle apparatus according to the embodiment. As illustrated in FIG. 1, an in-vehicle apparatus 1 includes an operation section 10, a touch panel 12, an input control section 14, a display processing section 20, a display device 22, a digital-to-analog converter (D/A) 30, a speaker 32, a control section 50, a hard disk drive (HDD) 70, and a wireless local area network (LAN) interface section (I/F) 80.

The operation section 10 receives an operation performed by a user on the in-vehicle apparatus 1, and includes various operation keys, operation switches, operation knobs, and the like that are disposed around the display device 22. When various operation screens or input screens are displayed on the display device 22, the user directly points at part of these operation screens or input screens with a finger or the like, and thus the user may select items displayed on the operation screens or input screens. In order to enable operation using such operation screens or input screens, there is provided the touch panel 12 that detects a location pointed at with a finger or the like. In addition, part of the operation screens or input screens may be selected in accordance with a user's instruction by using a remote control unit or the like in place of a touch panel. The input control section 14 monitors the operation section 10 and the touch panel 12, and determines details of operation of the operation section 10 and the touch panel 12.

The display processing section 20 outputs video signals for displaying various operation screens, input screens, and the like, and displays these screens on the display device 22, and also outputs video signals for displaying Internet screens, video screens corresponding to moving images, and the like, and displays these screens on the display device 22. The display device 22 is installed in front of and midway between a driver seat and a front passenger seat, and is constituted by, for example, a liquid crystal display (LCD).

The digital-to-analog converter 30 converts audio data or music data generated when a moving image or music is played into an analog audio signal, and outputs it from the speaker 32. Actually, an amplifier that amplifies a signal is connected between the digital-to-analog converter 30 and the speaker 32, and the illustration of this amplifier is omitted in FIG. 1. The same number of combinations of the digital-to-analog converter 30 and the speaker 32 as the number of playback channels are provided; however, only one combination is illustrated in FIG. 1.

The control section 50 controls the entire in-vehicle apparatus 1, and also performs various processes, such as Internet connections, e-mail transmission/reception, and playing of moving images. The control section 50 is implemented by causing a central processing unit (CPU) to execute a certain program stored in a read only memory (ROM), a random access memory (RAM), or the like.

The wireless LAN interface section 80 is a communication apparatus for making a LAN connection to an external wireless device by using a certain radio frequency band. In the embodiment, for example, three types of wireless communication modes, which are an access point (AP) mode, a Direct mode, and a station (STA) mode, are supported.

Furthermore, the above-mentioned control section 50 includes an Internet processing section 51, a mail processing section 52, a moving-image processing section 53, an STA mode processing section 54, a Direct mode processing section 55, an AP mode processing section 56, a wireless device retrieval section 61, a wireless communication mode display processing section 62, a wireless communication mode selection section 63, a wireless device storage section 64, a wireless device display processing section 65, a wireless device selection section 66, a connection history storage section 67, and a warning section 68.

The Internet processing section 51 has a web browser function, makes Internet connections by using the above-mentioned STA mode via the wireless LAN interface section 80, and performs data transmission/reception to/from various servers. The mail processing section 52 creates e-mail messages, connects to a mail server by using the above-mentioned STA mode via the wireless LAN interface section 80, and performs a process of e-mail transmission/reception. The moving-image processing section 53 reads moving-image data stored in, for example, the hard disk drive 70, and performs an operation of playing a moving image. A video signal and an audio signal are generated through playing of the moving image, the video signal is displayed on the display device 22 via the display processing section 20, and the audio signal is output from the speaker 32 via the digital-to-analog converter 30. Alternatively, the video signal and the audio signal may be transmitted to an external mobile terminal device by using the above-mentioned Direct mode via the wireless LAN interface section 80.

The STA mode processing section 54 performs a connection process using an STA mode. The STA mode is a wireless communication standard for providing, for example, a Tethering or Mobile Router service. The use of the STA mode enables Internet connections or e-mail transmission/reception via an external wireless LAN router.

The Direct mode processing section 55 performs a connection process using a Direct mode. The Direct mode is a wireless communication standard for providing, for example, a Mirror Link or Miracast service. The use of the Direct mode enables a video signal and an audio signal that have been generated by the moving-image processing section 53 to be transmitted to an external mobile terminal device without involving an access point.

The AP mode processing section 56 performs a connection process using an AP mode. The AP mode is a wireless communication standard for providing, for example, an iOS in the Car service. The use of the AP mode enables an operation instruction to be given to a mobile terminal device by using the operation section 10 and the touch panel 12 that are included in the in-vehicle apparatus 1, or an image displayed on the mobile terminal device to be displayed on the display device 22 of the in-vehicle apparatus 1.

The wireless device retrieval section 61 retrieves a connectable wireless device for each of three wireless communication modes (AP mode, Direct mode, and STA mode).

The wireless communication mode display processing section 62 displays, on the display device 22, via the display processing section 20, wireless communication modes corresponding to connectable wireless devices whose existence has been checked by the wireless device retrieval section 61.

The wireless communication mode selection section 63 selects, in accordance with an operation instruction from the user received by the operation section 10 or the touch panel 12, one from among the wireless communication modes displayed on the display device 22 by the wireless communication mode display processing section 62.

The wireless device storage section 64 associates retrieval results provided by the wireless device retrieval section 61 with a respective plurality of wireless communication modes, and stores them.

The wireless device display processing section 65 reads, from the wireless device storage section 64, connectable wireless devices corresponding to the wireless communication mode selected by the wireless communication mode selection section 63, and displays them on the display device 22 via the display processing section 20. As for a display format, any format may be employed as long as it enables the detected wireless devices to be identified.

The wireless device selection section 66 selects, in accordance with an operation instruction from the user received by the operation section 10 or the touch panel 12, one from among the wireless devices displayed by the wireless device display processing section 65.

The connection history storage section 67 stores, as a connection history A, identification information of a wireless device that has been last connected for each wireless communication mode. The connection history storage section 67 also stores, as a connection history B, identification information of a wireless device that has been connected immediately before power-off and a wireless communication mode corresponding to this wireless device.

When power is applied, the warning section 68 reads a connection history stored in the connection history storage section 67, and outputs a predetermined warning when the wireless device retrieval section 61 retrieves a wireless device contained in this connection history in combination with a wireless communication mode different from that contained in the connection history.

The wireless device retrieval section 61 corresponds to a wireless device retrieval unit. The wireless communication mode display processing section 62, the display processing section 20, and the display device 22 correspond to a wireless communication mode display unit. The operation section 10 and the touch panel 12 correspond to an operation unit. The wireless communication mode selection section 63 corresponds to a wireless communication mode selection unit. The STA mode processing section 54, the Direct mode processing section 55, the AP mode processing section 56, and the wireless LAN interface section 80 correspond to a wireless connection unit. The wireless device storage section 64 corresponds to a wireless device storage unit. Furthermore, the wireless device display processing section 65, the display processing section 20, and the display device 22 correspond to a wireless device display unit. The wireless device selection section 66 corresponds to a wireless device selection unit. The connection history storage section 67 corresponds to a connection history storage unit. The warning section 68, the display processing section 20, and the display device 22 correspond to a warning unit.

Figure 2:
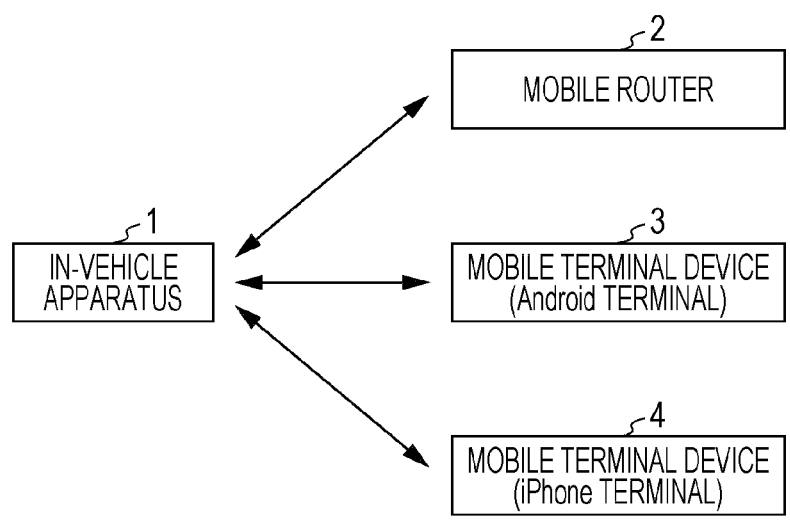
FIG. 2 illustrates a specific example of wireless devices able to be wirelessly connected to the in-vehicle apparatus.

The in-vehicle apparatus 1 according to the embodiment has such a configuration, and operations performed by the in-vehicle apparatus 1 will be described. FIG. 2 illustrates a specific example of wireless devices to be wirelessly connected to the in-vehicle apparatus 1. In the embodiment, suppose that connectable wireless devices corresponding to three respective wireless communication modes are given. In the example illustrated in FIG. 2, a mobile router 2 and mobile terminal devices 3 and 4 correspond to these respective wireless devices.

The mobile router 2 is connectable to the in-vehicle apparatus 1 by using the STA mode, operates as an access point having a router function, and interconnects the in-vehicle apparatus 1 and the Internet. The mobile terminal device 3 is a terminal (Android terminal) using Android (registered trademark) as an operating system, is connectable to the in-vehicle apparatus 1 by using the Direct mode, and outputs a video signal and an audio signal that are transmitted from the in-vehicle apparatus 1. The mobile terminal device 4 is a terminal, referred to as an iPhone (registered trademark), using iOS (registered trademark) as an operating system, is connectable to the in-vehicle apparatus 1 by using the AP mode, and enables various instructions or displays using the operation section 10, touch panel 12, or display device 22 of the in-vehicle apparatus 1 to be provided. For example, a navigation operation may be performed by executing a map application of the mobile terminal device 4, and a user's instruction for this navigation operation may also be given by using the operation section 10 of the in-vehicle apparatus 1, or a map image of the area around the user's own vehicle location generated through the navigation operation may be displayed on the display device 22 of the in-vehicle apparatus 1.

In FIG. 2, the case where one wireless device exists for each of the three wireless communication modes is described; however, there is the case where no wireless device exists, or the case where two or more wireless devices exist for one wireless communication mode.

Figure 3:
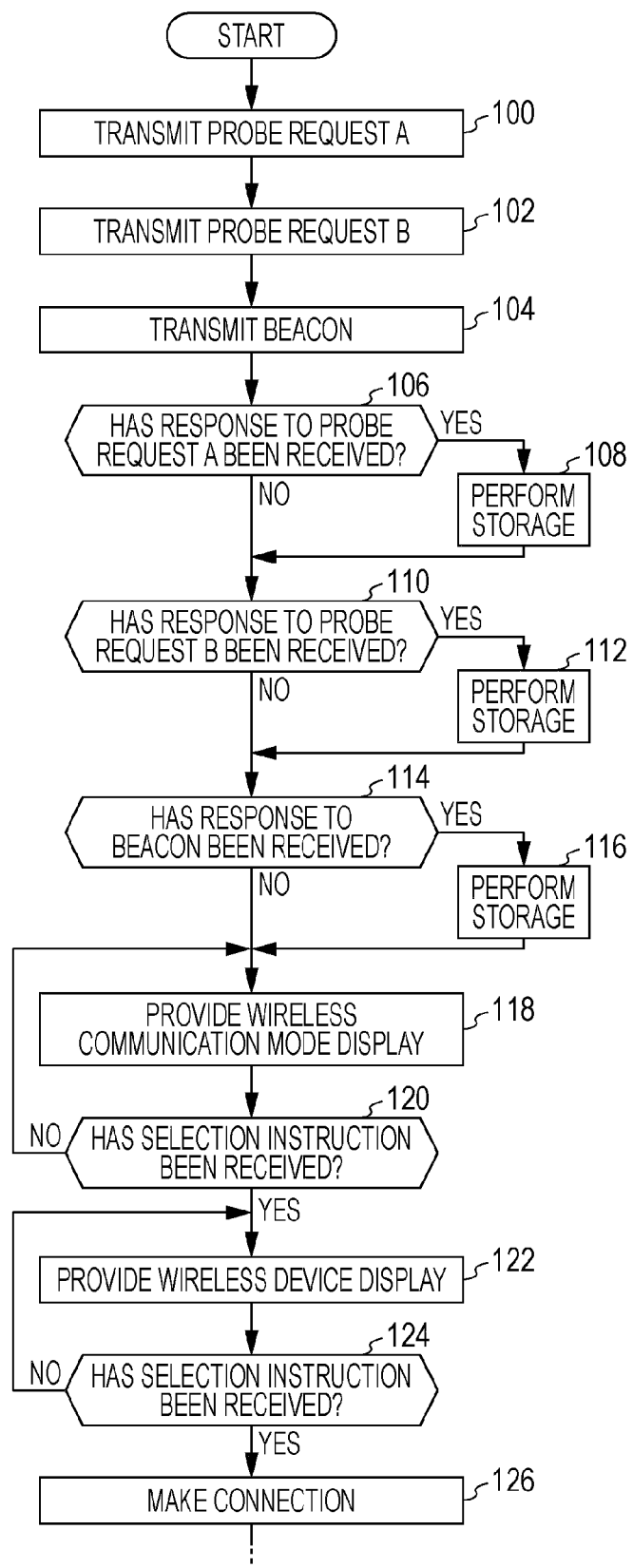
FIG. 3 is a flowchart illustrating operation steps in which the existence or non-existence of wireless devices connectable using three respective wireless communication modes is checked immediately after power is applied and a user is notified of whether each wireless communication mode is enabled or disabled.

FIG. 3 is a flowchart illustrating operation steps in which the existence or non-existence of wireless devices connectable using the three respective wireless communication modes is checked immediately after power is applied and the user is notified of whether each wireless communication mode is enabled or disabled.

When an accessory switch (not illustrated) is turned on to apply power to the in-vehicle apparatus 1, the wireless device retrieval section 61 starts to retrieve a connectable wireless device for each of the three wireless communication modes. Specifically, first, an instruction is transmitted from the wireless device retrieval section 61 to the STA mode processing section 54, and the STA mode processing section 54 transmits a probe request (A) from the wireless LAN interface section 80 (step 100). Similarly, an instruction is transmitted from the wireless device retrieval section 61 to the Direct mode processing section 55, and the Direct mode processing section 55 transmits a probe request (B) from the wireless LAN interface section 80 (step 102). In addition, an instruction is transmitted from the wireless device retrieval section 61 to the AP mode processing section 56, and the AP mode processing section 56 transmits a beacon from the wireless LAN interface section 80 (step 104).

Figure 4:
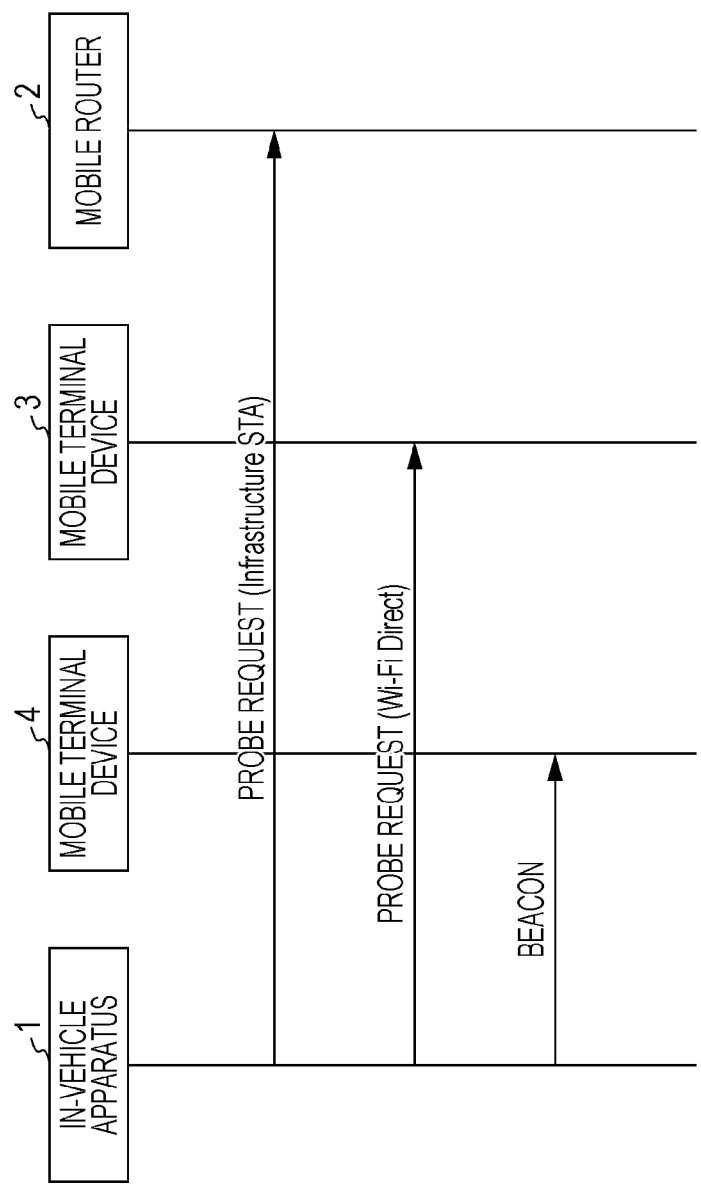
FIG. 4 illustrates steps of transmitting probe requests and a beacon.

FIG. 4 illustrates steps of transmitting probe requests and a beacon. The order in which these probe requests and beacon are transmitted may be changed, and the probe requests and beacon may be transmitted in any order.

Then, the wireless device retrieval section 61 determines whether or not a response to the probe request transmitted by the STA mode processing section 54 has been received (step 106). When a response has been received, a determination of YES is made, and the wireless device storage section 64 stores wireless device information in which identification information (for example, a media access control (MAC) address) for identifying a wireless device contained in the response is associated with a wireless communication mode (step 108).

Alternatively, when no response to the probe request transmitted by the STA mode processing section 54 has been received, a determination of NO is made in step 106, and then the wireless device retrieval section 61 determines whether or not a response to the probe request transmitted by the Direct mode processing section 55 has been received (step 110). When a response has been received, a determination of YES is made, and the wireless device storage section 64 stores wireless device information in which identification information (for example, a MAC address) for identifying a wireless device contained in the response is associated with a wireless communication mode (step 112).

Alternatively, when no response to the probe request transmitted by the Direct mode processing section 55 has been received, a determination of NO is made in step 110, and then the wireless device retrieval section 61 determines whether or not a response to the beacon transmitted by the AP mode processing section 56 has been received (step 114). When a response has been received, a determination of YES is made, and the wireless device storage section 64 stores wireless device information in which identification information (for example, a MAC address) for identifying a wireless device contained in the response is associated with a wireless communication mode (step 116). In this way, retrieval of a connectable wireless device for each of the three wireless communication modes is completed, and the result thereof is stored by the wireless device storage section 64.

Then, in order that any of the three wireless communication modes may be selected, the wireless communication mode display processing section 62 provides a wireless communication mode display so that the existence or non-existence of connectable wireless devices is seen (step 118).

FIG. 5 illustrates an example of a wireless communication mode display. In the example illustrated in FIG. 5, three buttons corresponding to the three respective wireless communication modes are included. An "iOS" button corresponds to the AP mode, a "Mirror Link" button corresponds to the Direct mode, and a "Tethering" button corresponds to the STA mode. In addition, in the example illustrated in FIG. 5, the case where a wireless device corresponding to the Direct mode does not exist is illustrated. The "iOS" button and the "Tethering" button for wireless devices that exist, and the "Mirror Link" button for a wireless device that does not exist are displayed in a state in which these buttons can be distinguished from one another. For example, the "Mirror Link" button is displayed in gray, and the other buttons are colored green. The user may learn, on the basis of differences between display styles of the buttons, that a wireless device corresponding to the "Mirror Link" button (Direct mode) does not exist.

Then, the wireless communication mode selection section 63 determines whether or not either of the "iOS" button and the "Tethering" button for the corresponding wireless devices that exist has been selected (step 120). When no selection has been made, a determination of NO is made, the process returns to step 118, and a wireless communication mode display is repeatedly provided.

When either of the "iOS" button and the "Tethering" button has been selected by using the operation section 10 or the touch panel 12, a determination of YES is made in step 120. Then, the wireless device display processing section 65 reads, from the wireless device storage section 64, a wireless device corresponding to a wireless communication mode of the selected button, and displays one or a plurality of wireless devices connectable in this wireless communication mode (step 122). For example, a symbol assigned to each wireless device and identification information (for example, a MAC address) of each wireless device are displayed in list form.

Then, the wireless device selection section 66 determines whether or not any of the wireless devices each associated with a symbol and identification information has been selected (step 124). When no selection has been made, a determination of NO is made, the process returns to step 122, and a wireless device display is repeatedly provided. When any of the wireless devices has been selected by using the operation section 10 or the touch panel 12, a determination of YES is made in step 124. Then, the wireless device selection section 66 transmits an instruction to the STA mode processing section 54, the Direct mode processing section 55, or the AP mode processing section 56 that corresponds to the wireless communication mode of the selected wireless device, and a wireless connection to the selected wireless device is made (step 126).

In order that a connection to a wireless device may actually be made, connection information, such as a password, has to be input before the connection. It is assumed that input of connection information for each wireless device has already been completed. In other words, connection information input has to be completed before the operation steps illustrated in FIG. 3 are performed.

In this way, in the in-vehicle apparatus 1 according to the embodiment, when there are a plurality of wireless communication modes corresponding to actually connectable wireless devices whose existence has been checked, the plurality of wireless communication modes are displayed (FIG. 5), and the user may therefore see the displayed details to check the plurality of wireless communication modes. In addition, the user may select any one from among the plurality of wireless communication modes corresponding to the actually connectable wireless devices whose existence has been checked.

Furthermore, a wireless communication mode corresponding to a connectable wireless device whose existence has not been checked is displayed in a display style in which the wireless communication mode can be distinguished from wireless communication modes corresponding to connectable wireless devices whose existence has been checked (FIG. 5), thereby saving the user from having to make a selection again because the user has incorrectly selected a wireless communication mode corresponding to a connectable wireless device that does not exist.

Furthermore, when the existence or non-existence of a connectable wireless device is checked for each wireless communication mode, the wireless device storage section 64 associates the connectable wireless device with the wireless communication mode, and stores it. Thus, after a wireless communication mode is selected, a time period taken to check a wireless device connectable using this wireless communication mode may be reduced. In addition, at a point in time when a connectable wireless device is retrieved for each of a plurality of wireless communication modes, the connectable wireless device has been authenticated, and thus a time period that elapses before the wireless device to which a connection has been made after specifying the wireless communication mode starts to operate may be reduced.

(First Modification)

Identification information (for example, a MAC address) of a wireless device that has been last connected for each wireless communication mode may be stored as a connection history, and the next time power is applied, this stored connection history may be read and a predetermined warning may be output when the wireless device retrieval section 61 retrieves the wireless device contained in this connection history in combination with a wireless communication mode different from that contained in the connection history.

FIG. 6 is a partial flowchart illustrating an additional operation step required to store a connection history according to a first modification. In operation steps illustrated in FIG. 6, an operation step of step 128 in which a wireless device that has been actually connected is stored as a connection history for each wireless communication mode is added following step 126 included in the operation steps illustrated in FIG. 3. When a wireless device is actually connected in step 126, details of a connection history for this wireless device are updated.

FIG. 7 illustrates stored details of a wireless device that has been actually connected for each wireless communication mode. In FIG. 7, "last mode" denotes three wireless communication modes, and "Mirror Link" corresponds to the Direct mode, "iOS in the Car" to the AP mode, and "Tethering" to the STA mode. For each of the three wireless communication modes, a wireless device that has been last connected is stored.

Figure 8:
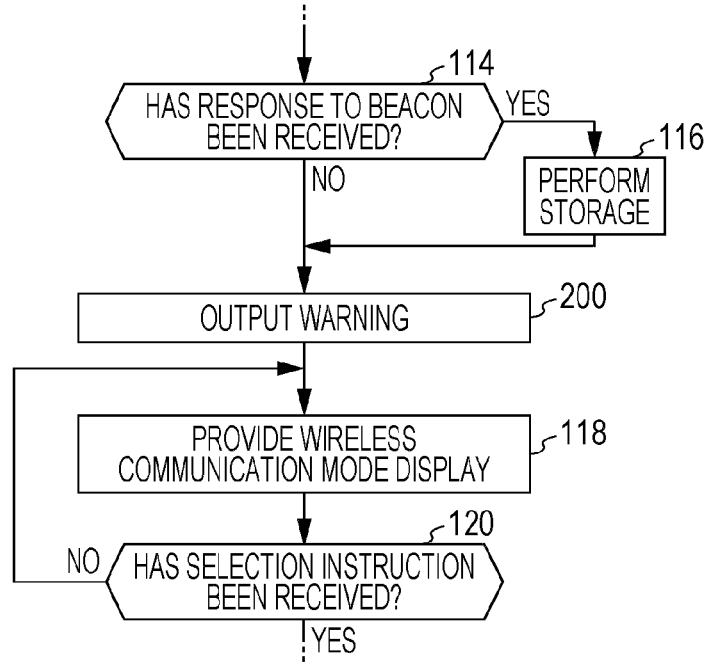
FIG. 8 is a partial flowchart illustrating an additional operation step required to output a warning according to the first modification.
Figure 9:
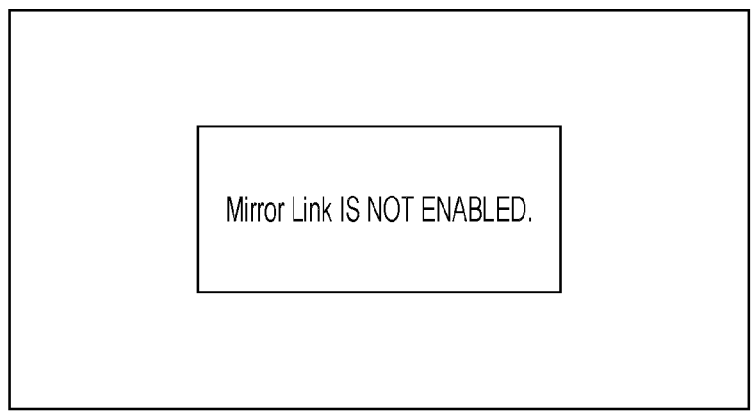
FIG. 9 illustrates an example of a warning.

FIG. 8 is a partial flowchart illustrating an additional operation step required to output a warning according to the first modification. In the operation steps illustrated in FIG. 8, step 200 in which a warning is output under certain conditions is added between step 114 and step 118 that are included in the operation steps illustrated in FIG. 3. In step 200, when, as a current wireless device retrieval result, a wireless device contained in a connection history (FIG. 7) stored before then is retrieved in combination with a wireless communication mode different from that contained in this connection history, a predetermined warning is output. For example, as illustrated in FIG. 7, when a MAC address "12:34:56:78:9a:bc" is stored for "Mirror Link" (Direct mode), in the case where, as a current wireless device retrieval result, a mobile terminal device having a MAC address other than "12:34:56:78:9a:bc" is retrieved as a connectable wireless device for the Direct mode, a predetermined warning is output. FIG. 9 illustrates an example of a warning. In the example illustrated in FIG. 9, a warning is given by displaying a message "Mirror Link is not enabled." on part of a screen.

In the first modification, the user may be notified of a change in a usage environment relating to, for example, forgetting to turn on a wireless device which is usually used, and a careless mistake may be dealt with in advance.

(Second Modification)

Identification information (for example, a MAC address) of a wireless device that has been last connected immediately before power-off and a wireless communication mode corresponding to this wireless device may be stored as a connection history, and also this stored connection history may be read the next time power is applied, and when a connection can be made by using the wireless communication mode and the wireless device that are specified in this connection history, a wireless connection to this wireless device may be made.

Figure 10:
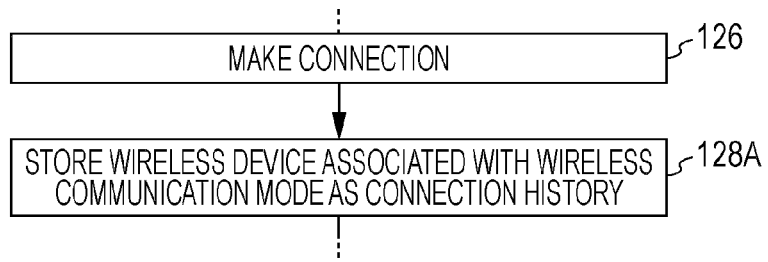
FIG. 10 is a partial flowchart illustrating an additional operation step required to store a connection history according to a second modification.

FIG. 10 is a partial flowchart illustrating an additional operation step required to store a connection history according to a second modification. In the operation steps illustrated in FIG. 10, step 128A in which a wireless device that has been actually connected is stored as a connection history together with a wireless communication mode is added following step 126 included in the operation steps illustrated in FIG. 3. When a wireless device is actually connected in step 126, only information on a combination of this wireless device and a wireless communication mode is stored as a connection history.

Figure 11:
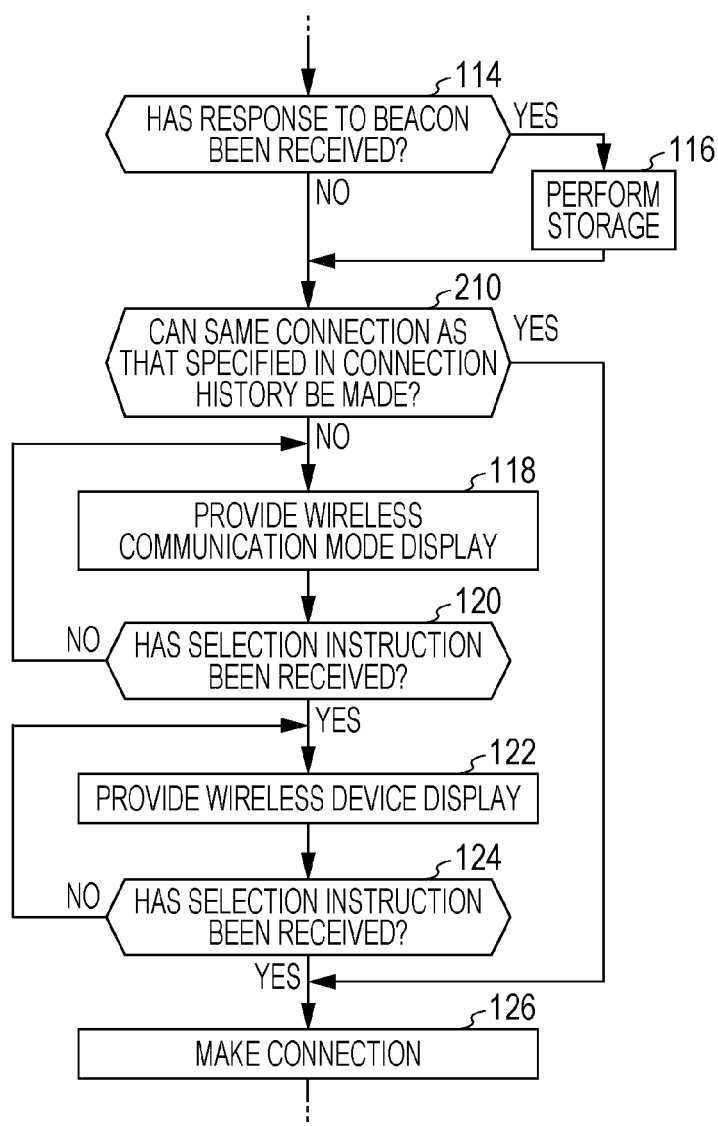
FIG. 11 is a partial flowchart illustrating an additional operation step required to automatically make a wireless device connection the next time power is applied according to the second modification.

FIG. 11 is a partial flowchart illustrating an additional operation step required to automatically make a wireless device connection the next time power is applied according to the second modification. In the operation steps illustrated in FIG. 11, step 210 in which it is determined whether or not the same connection as that specified in a stored connection history can be made is added between step 114 and step 118 that are included in the operation steps illustrated in FIG. 3. When the connection can be made (when a wireless device that has been last connected immediately before power-off is currently detected as a wireless device connectable using the same wireless communication mode), a determination of YES is made, the process proceeds to step 126, and then a connection to this wireless device is immediately made. On the other hand, when the same connection as that specified in a stored connection history cannot be made, a determination of NO is made in step 210. In this case, the process proceeds to step 118, and the operation of providing, as an example, the wireless communication mode display illustrated in FIG. 5 and the subsequent operations are performed.

In the second modification, as a result of checking a wireless device that has been actually connected for each of a plurality of wireless communication modes, when a wireless device that has been last connected can be connected once again, a connection to this wireless device may be made, and subsequent operations may continue to be performed.

The present invention is not limited to the above-mentioned embodiments, and various modifications may be made within the scope of the present invention. In the above-mentioned embodiment, retrieval of a connectable wireless device (FIG. 3) is performed for each wireless communication mode immediately after power is applied; alternatively, this retrieval may be performed at a certain point in time specified by the user using the operation section 10 or the touch panel 12. Thus, the user may check or select a wireless communication mode corresponding to a usable wireless device without performing a complicated operation in the case where, for example, a usage environment of a wireless device is changed.

As described above, according to the present disclosure, when there are a plurality of wireless communication modes corresponding to actually connectable wireless devices whose existence has been checked, the plurality of wireless communication modes are displayed, and a user may therefore see the displayed details to check the plurality of wireless communication modes.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic apparatus capable of connecting to wireless devices by using a plurality of wireless communication modes, the electronic apparatus comprising:
   a wireless device retrieval unit that retrieves a connectable wireless device for each of the plurality of wireless communication modes; and
   a wireless communication mode display unit that displays wireless communication modes corresponding to connectable wireless devices whose existence has been checked by the wireless device retrieval unit;
   wherein the wireless device retrieval unit instructs transmission of a first probe request to retrieve connectable wireless devices corresponding to a station mode, a second probe request to retrieve connectable wireless devices corresponding to a direct mode, and a beacon to retrieve connectable wireless devices corresponding to an access point mode.

2. The electronic apparatus according to claim 1, further comprising:
   an operation unit that receives an operation instruction given by a user;
   a wireless communication mode selection unit that selects, in accordance with the operation instruction from the user received by the operation unit, one from among the wireless communication modes displayed by the wireless communication mode display unit; and
   a wireless connection unit that makes a wireless connection to a wireless device corresponding to the wireless communication mode selected by the wireless communication mode selection unit.

3. The electronic apparatus according to claim 2,
   wherein the wireless communication mode display unit displays a wireless communication mode corresponding to a connectable wireless device whose existence has not been checked in a display style which can be distinguished from the wireless communication modes corresponding to the connectable wireless devices whose existence has been checked.

4. The electronic apparatus according to claim 2, further comprising:
   a wireless device storage unit that associates retrieval results provided by the wireless device retrieval unit with the plurality of wireless communication modes, and store the retrieval results; and
   a wireless device display unit that reads, from the wireless device storage unit, connectable wireless devices corresponding to the wireless communication mode selected by the wireless communication mode selection unit, and display the connectable wireless devices.

5. The electronic apparatus according to claim 4, further comprising
a wireless device selection unit that selects, in accordance with an operation instruction from the user received by the operation unit, one from among the wireless devices displayed by the wireless device display unit,
wherein the wireless connection unit makes a wireless connection to the wireless device selected by the wireless device selection unit.

6. The electronic apparatus according to claim 2, further comprising:
a connection history storage unit that stores, as a connection history, identification information of a wireless device that has been last connected for each wireless communication mode; and
a warning unit that reads the connection history stored in the connection history storage unit when power is applied, and output a predetermined warning when the wireless device retrieval unit retrieves the wireless device contained in the connection history in combination with a wireless communication mode different from that contained in the connection history.

7. The electronic apparatus according to claim 2, further comprising
a connection history storage unit that stores, as a connection history, identification information of a wireless device that has been connected immediately before power-off and a wireless communication mode corresponding to the wireless device,
wherein the wireless connection unit reads the connection history stored in the connection history storage unit when power is applied, and when a wireless connection corresponding to the wireless communication mode and the wireless device that are specified in the connection history can be made, the wireless connection unit makes a wireless connection to the wireless device.

8. The electronic apparatus according to claim 2,
wherein the wireless device retrieval unit performs continuous transmission of a corresponding probe request or beacon for each of the plurality of wireless communication modes.

9. The electronic apparatus according to claim 2,
wherein the wireless device retrieval unit retrieves a wireless device at startup.

10. The electronic apparatus according to claim 2,
wherein the wireless device retrieval unit retrieves a wireless device at a point in time specified by the user.

11. A wireless device checking method for checking a wireless device connectable to an electronic apparatus by using any of a plurality of wireless communication modes, the method comprising:
retrieving, with a wireless device retrieval unit, a connectable wireless device for each of the plurality of wireless communication modes; and
displaying, with a wireless communication mode display unit, wireless communication modes corresponding to connectable wireless devices whose existence has been checked by the wireless device retrieval unit;
wherein the wireless device retrieval unit instructs transmission of a first probe request to retrieve connectable wireless devices corresponding to a station mode, a second probe request to retrieve connectable wireless devices corresponding to a direct mode, and a beacon to retrieve connectable wireless devices corresponding to an access point mode.

12. The method according to claim 11, further comprising:
receiving, with an operation unit, an operation instruction given by a user;
selecting, with a wireless communication mode selection unit, in accordance with the operation instruction from the user received by the operation unit, one from among the wireless communication modes displayed by the wireless communication mode display unit; and
making a wireless connection, with a wireless connection unit, to a wireless device corresponding to the wireless communication mode selected by the wireless communication mode selection unit.

13. The method according to claim 12,
wherein the wireless communication mode display unit displays a wireless communication mode corresponding to a connectable wireless device whose existence has not been checked in a display style which can be distinguished from the wireless communication modes corresponding to the connectable wireless devices whose existence has been checked.

14. The method according to claim 12, further comprising:
associating, with a wireless device storage unit, retrieval results provided by the wireless device retrieval unit with the plurality of wireless communication modes, and storing the retrieval results; and
reading, with a wireless device display unit, from the wireless device storage unit, connectable wireless devices corresponding to the wireless communication mode selected by the wireless communication mode selection unit, and displaying the connectable wireless devices.

15. The method according to claim 14, further comprising
selecting, with a wireless device selection unit, in accordance with an operation instruction from the user received by the operation unit, one from among the wireless devices displayed by the wireless device display unit,
wherein the wireless connection unit makes a wireless connection to the wireless device selected by the wireless device selection unit.

16. The method according to claim 12, further comprising:
storing, with a connection history storage unit, as a connection history identification information of a wireless device that has been last connected for each wireless communication mode; and
reading, with a warning unit, the connection history stored in the connection history storage unit when power is applied, and outputting a predetermined warning when the wireless device retrieval unit retrieves the wireless device contained in the connection history in combination with a wireless communication mode different from that contained in the connection history.

17. The method according to claim 12, further comprising
storing, with a connection history storage unit, as a connection history, identification information of a wireless device that has been connected immediately before power-off and a wireless communication mode corresponding to the wireless device,
wherein the wireless connection unit reads the connection history stored in the connection history storage unit when power is applied, and when a wireless connection corresponding to the wireless communication mode and the wireless device that are specified in the connection history can be made, the wireless connection unit makes a wireless connection to the wireless device.

18. The method according to claim 12,
wherein the wireless device retrieval unit performs continuous transmission of a corresponding probe request or beacon for each of the plurality of wireless communication modes.

19. The method according to claim 12,
wherein the wireless device retrieval unit retrieves a wireless device at startup.

20. The method according to claim 12,
wherein the wireless device retrieval unit retrieves a wireless device at a point in time specified by the user.

* * * * *